July 26, 1949.   I. J. KUERT ET AL   2,477,065
COMBINED BRAKE AND REVERSING TRANSMISSION
CLUTCH CONTROL AND OPERATING MECHANISM
Filed April 28, 1947   2 Sheets-Sheet 1

INVENTORS
IRA J. KUERT
B. M. CRAIG
BY
ATTORNEY

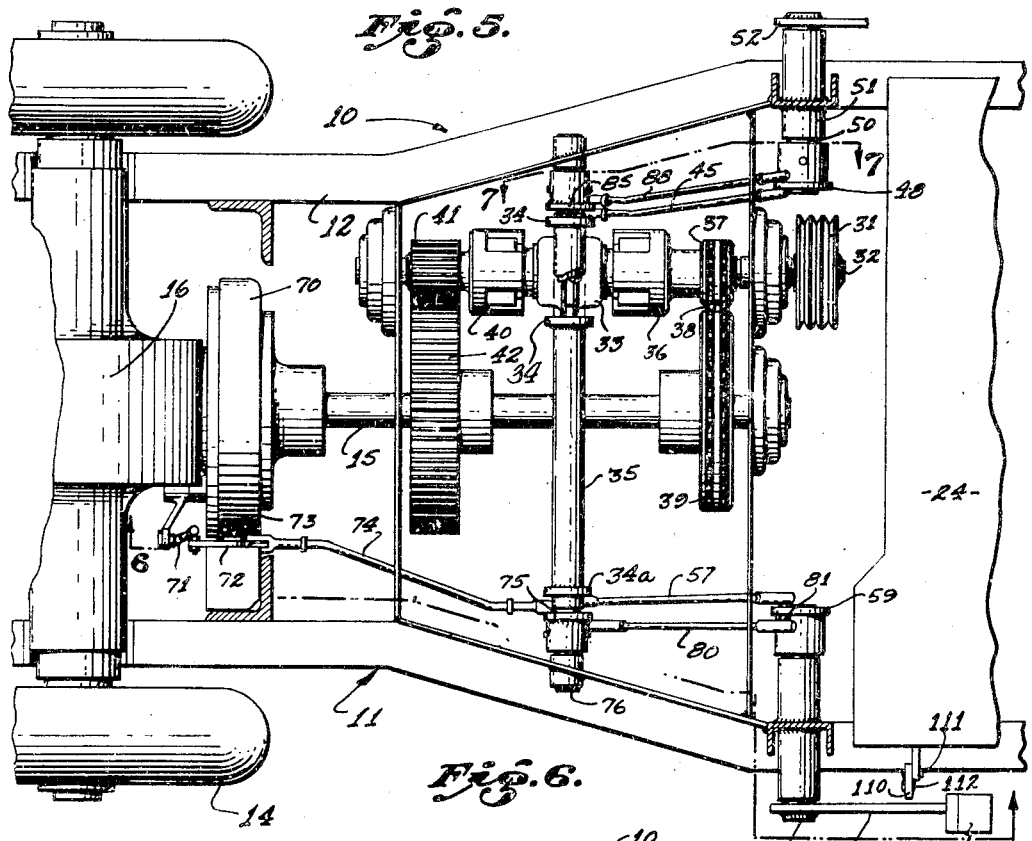

Patented July 26, 1949

2,477,065

UNITED STATES PATENT OFFICE 2,477,065

COMBINED BRAKE AND REVERSING TRANS-MISSION CLUTCH CONTROL AND OPERATING MECHANISM

Ira J. Kuert, San Gabriel, and Burnie M. Craig, Pasadena, Calif.; said Craig assignor to said Kuert Application April 28, 1947, Serial No. 744,354

5 Claims. (Cl. 180—77)

1

This invention relates to a combined brake and reversing transmission clutch control and operating mechanism.

The general object of the invention is to provide an improved batch loader including novel transmission control mechanism which is particularly adapted for furnishing materials to a concrete mixing machine.

Other objects and advantages of the invention will be apparent from the following description taken in connection with the accompanying drawings, wherein:

Fig. 1 is a side elevation with parts broken away showing our improved batcher;

Fig. 2 is a top plan view with parts broken away showing the batcher;

Fig. 3 is a front end view of the batcher;

Fig. 4 is a section taken on line 4—4, Fig. 1;

Fig. 5 is a fragmentary top plan view with parts removed, showing the driving and control mechanism;

Fig. 6 is a view taken on line 6—6, Fig. 5;

Fig. 7 is a view taken on a line 7—7, Fig. 5, and Fig. 8 is a view taken on line 8—8, Fig. 6.

Referring to the drawing by reference characters, we have shown our invention as embodied in a batcher which is indicated generally at 10. As shown, the batcher includes a frame 11 which includes side rails 12 and connecting members 13. The frame supports a pair of front wheels 14 which are adapted to be driven from a shaft 15 by means of a differential 16. The frame also includes tandem rear steering wheels 17 having a vertically extending shaft 18 mounted in bearings 19 and having an arm 20 secured to the shaft 18 so that the wheels 17 may be steered by a link 21 which is connected to a steering lever 22, the latter being supported in brackets 23 arranged on a transverse plate 24 which connects the rails 12.

The structure includes a seat support 25 and an operator's seat 26. Mounted on the transverse plate 24 we provide a prime mover such as a gasoline engine 27 which may be operated by any suitable controls and which includes a drive shaft 28.

The drive shaft 28 has a pulley 29 thereon for a multiple V-belt 30 which passes over a pulley 31 on a shaft 32 to drive the latter.

The shaft 32 supports and drives a slidable double clutch 33 which is operable by spaced yoke arms 34 which are mounted on a tubular shaft 35 and the construction is such that when the arms 34 are operated to the left in Fig. 7, it will cause a clutch element 36 on the shaft 32 to

2 drive a double chain sprocket 37 which drives a chain 38 on a sprocket 39. The sprocket 39 is on the shaft 15 which supplies power to the driving wheels 14 through the differential 16.

The tubular shaft 33 also carries an arm 34ª. When the arm 34ª is operated to the left in Fig 6 (or to the right in Fig. 7) it will cause a two-way clutch element 40 on the shaft 32 to drive a gear 41. Clutches of this types are well known and form no part of our invention. The gear 41 meshes with a gear 42 on the shaft 15 to thus drive the shaft 15 in the direction which is reverse to that in which it is driven by the sprocket 39. Thus it will be seen that moving the arms 34 and 34ª to thereby rock the shaft 35 in either direction will cause a corresponding reversal in the direction of rotation of the drive wheels 14. The arms 34 and 34ª when in neutral position produce an idling operation of the drive shaft.

In order to rock the arms 34 we provide a link 45 which has a slot 46 at one end which receives a pin 47 on the outer one of the arms 34. The other end of the link is connected to an arm 48 by a pin 49. The arm 48 is on a shaft 50 mounted in a bearing 51 on the vehicle frame. The shaft 50 has an arm 52 thereon which has a foot pedal 53 on the end thereof and in position to be engaged by the foot of an operator. From the construction it will be seen that when the pedal 53 is depressed the shaft 50 will be rotated to rock the arm 48 to cause the link 45 to first move to the end of the slot 46 thus causing a lull in the clutching operation while the brake is being released, (which will be presently described) and to thereafter rock the arms 34.

The arm 34ª has a pin 55 (see Fig. 6) thereon which fits in a slot 56 on a link 57. The link 57 is connected by a pin 58 to an arm 59 on a shaft 60 which in turn has an arm 61 thereon which supports a pedal 62 and the construction is such that when the pedal 62 is depressed the link 57 will be shifted when the pin 55 engages the end of the slot 56 to thereby rock the arm 34ª in a direction in reverse to that of the direction of movement of the arms 34 when the pedal 53 is depressed.

In order to provide a braking operation the shaft 15 includes a brake member 70 which is constructed to be normally in the "on" or braking position and which is released by pulling a link 71 pivotally connected by a pin 71' to a plate 72 which is pivoted at 73 to the frame. The plate is rocked by a link 74 which is pivotally connected to an arm 75 mounted on a shaft 76 arranged within the tubular shaft 35.

The arm 75 has a pin 78 thereon which fits in a slot 79 in a link 80 which is connected by a pin 81 to an arm 82 on the shaft 60. Thus when the pedal 62 is depressed the link 80 will be pulled, rocking the arm 75, which latter causes the link 74 to rock the plate 72 and thus shift the member 71 to brake releasing position. This release of the brake occurs before the pin 55 reaches the end of the slot 56 so that the brake release occurs prior to the clutch engagement.

The shaft 76 extends across the frame and adjacent to the pedal 53 and includes an arm 85 which has a pin 86 thereon which fits in a slot 87 on a link 88 which is pivotally connected to the arm 48 at 88'. Thus when the shaft 50 is rocked by the pedal 53 the link 88 will cause a brake to be released before the pin 47 on link 45 engages in the end of the slot 46. The slot 79 in the link 80 and the slot 87 in the link 88 permit idle movement of the pin 78 in the slot 79, and pin 86 in slot 87 to allow movement of the control pedals 53 and 62 as previously described.

The frame 11 includes a pair of track members 90 suitably mounted on supports 91 held on the frame by bolts 91'. The tracks 90 are engaged by grooved wheels 92 mounted on shafts 93 on a concrete aggregate hopper 94. A plate 95 on the hopper receives a pin 96, slidable by a handle 97 and mounted on a bracket 98 mounted on the frame 11 to hold the hopper in loading position. To discharge the hopper the pin 96 is released and the hopper is rolled to the left in Fig. 1 with the wheels 92 running along the track 90.

The dumping action of the hopper 94 is controlled by a pair of connected arms 100 and 101 pivotally attached to brackets 102 and 103 on the forward end of the hopper by a rod 104. The lower ends of the arms 100 and 101 are pivotally attached to the frame 11 by a rod 105. The hopper dumping action is described in my copending application Serial No. 744,355, filed April 28, 1947.

In the construction shown, the gears 41 and 42 drive in a direction to cause backward movement of the vehicle. The ratio of these gears is lower than the ratio of the sprockets 37 and 39; thus the backing movement from the constant speed engine 27 is slower, which is desirable because it is more difficult to steer backwards. Also, the construction supplies more power in backing and this is desirable in batch loaders.

It frequently becomes desirable to push the batch loader by hand, as in a garage, and in order to hold the brake off, I provide the frame 11, Fig. 8, with a dog 110 which is pivoted at 111 to the frame. The dog is in the path of movement of the arm 61. A spring 112 normally urges the dog 110 downwardly. To hold the arm 61 partly depressed so that the brake will be off, the arm is lowered sufficiently to permit the dog 110 to be moved out by hand so that it is above the arm 61. The arm 61 is then released whereupon the dog 110 prevents upward movement of the arm. When the arm 61 is moved a short distance downwardly, the spring 112 will move the dog 110 to the dotted line position in Fig. 8 so that the arm 61 may move freely up and down.

Having thus described our invention, we claim:

1. A batch loader including a frame having a pair of wheels thereon, a main shaft, means to drive said shaft, a clutch member free on said main shaft, a drive shaft, means, including the clutch member connecting said main shaft to said drive shaft and adapted to drive the drive shaft in one direction, a second clutch member free on the main shaft, other means including the second clutch member, connecting said main shaft to said drive shaft and adapted to drive the drive shaft in a reverse direction, means drivingly connecting said wheels with said drive shaft, shiftable clutch means drivingly connected to said main shaft for selectively engaging either of said two clutch members, a transverse shaft mounted on said frame, an arm on said transverse shaft, another arm on said transverse shaft, said arms extending in the same direction, means whereby rocking movement of said arms in either direction selectively shifts said clutch means, a foot pedal shaft on said frame, pedal means to rock said foot pedal shaft, an arm on said foot pedal shaft, a second foot pedal shaft on said frame, an arm on said second foot pedal shaft, said foot pedal shaft arms extending radially in relatively opposite directions from their respective pedal shafts, means connecting one of said foot pedal shaft arms to said first arm on the transverse shaft, and means connecting the other foot pedal shaft arm to the other arm on the transverse shaft.

2. A batch loader including a frame having a pair of wheels thereon, a main shaft, means to drive said shaft, a clutch member free on said main shaft, a drive shaft, means, including the clutch member connecting said main shaft to said drive shaft and adapted to drive the drive shaft in one direction, a second clutch member free on said main shaft, other means including the second clutch member, connecting said main shaft to said drive shaft and adapted to drive the drive shaft in a reverse direction, means drivingly connecting said wheels with said drive shaft, a double clutch element drivingly connected to, and shiftable in two directions on, said main shaft for selectively engaging either of said two clutch members, a transverse shaft mounted on said frame, a pair of yoke arms on said transverse shaft, another arm on said transverse shaft, said arms extending in the same direction, means whereby rocking movement of said arms in either direction selectively shifts said clutch element, a foot pedal shaft on said frame, pedal means to rock said foot pedal shaft, an arm on said foot pedal shaft, a second foot pedal shaft on said frame, an arm on said second foot pedal shaft, said foot pedal shaft arms extending radially in relatively opposite directions from their respective pedal shafts, means connecting one of said foot pedal shaft arms to one of said yoke arms, and means connecting the other foot pedal shaft arm to the other arm on the transverse shaft.

3. A batch loader including a frame having a pair of wheels thereon, a prime mover on said frame, a main shaft adjacent to said prime mover, means whereby said prime mover drives said main shaft, a clutch member free on said main shaft, a chain sprocket on said clutch member, a drive shaft, a chain sprocket fixed on said drive shaft, a chain connecting said chain sprockets, means drivingly connecting said wheels with said drive shaft, a second clutch member free on said main shaft, a gear on said second clutch member, a second gear fixed on said drive shaft and meshing with said first gear, a double clutch element drivingly connected to, and shiftable in two directions on, said main shaft for selectively engaging either of said two clutch members, a transverse tubular shaft mounted on said frame, a pair of yoke arms on said tubular shaft, another arm on said tubular shaft, said arms extending in the same direction, means whereby rocking movement of said arms in either direction selectively shifts said clutch element, a foot pedal shaft on said frame, pedal means to rock said foot pedal shaft, an arm on said foot pedal shaft, a second foot pedal shaft on said frame, an arm on said second foot pedal shaft, said foot pedal shaft arms extending radially in relatively opposite directions from their respective pedal shafts, means connecting one of said foot pedal shaft arms to one of said yoke arms, and means connecting the other foot pedal shaft arm to the other arm on the transverse tubular shaft.

4. A batch loader including a frame having a pair of wheels thereon, a main shaft, means to drive said shaft, a clutch member free on said main shaft, a drive shaft, means, including the clutch member connecting said main shaft to said drive shaft and adapted to drive the drive shaft in one direction, a second clutch member free on the main shaft, other means including the second clutch member, connecting said main shaft to said drive shaft to drive the drive shaft in a reverse direction, means drivingly connecting said wheels with said drive shaft, a double clutch element drivingly connected to, and shiftable in two directions on, said main shaft for selectively engaging either of said two clutch members, a transverse shaft mounted on said frame, a pair of yoke arms on said transverse shaft, another arm on said transverse shaft, said arms extending in the same direction, means whereby rocking movement of said arms in either direction selectively shifts said clutch element, a foot pedal shaft on said frame, pedal means to rock said foot pedal shaft, an arm on said foot pedal shaft, a second foot pedal shaft on said frame, an arm on said second foot pedal shaft, said foot pedal shaft arms extending radially in relatively opposite directions from their respective pedal shafts, means connecting one of said foot pedal shaft arms to one of said yoke arms, means connecting the other foot pedal shaft arm to the other arm on the transverse shaft, a brake on said drive shaft adapted to be normally urged to braking position, a brake operating shaft, an arm on said brake shaft, means connecting said brake shaft arm and said brake to release the latter, means connecting said brake shaft arm to one of said foot pedal shafts, a second arm on said brake shaft, means connecting said second brake shaft arm to the other foot pedal shaft, said last two mentioned connecting means including a lost motion joint, each said last two mentioned connecting means being disposed on the same side of said brake shaft and its lost motion joint being arranged so that movement of either pedal shaft causes a release of said brake prior to the aforesaid engagement of a clutch member.

5. A batch loader including a frame having a a pair of wheels thereon, a prime mover on said frame, a main shaft adjacent to said prime mover, means whereby said prime mover drives said main shaft, a clutch member free on said main shaft, a chain sprocket on said clutch member, a drive shaft, a chain sprocket fixed on said drive shaft, a chain connecting said chain sprockets, means drivingly connecting said wheels with said drive shaft, a second clutch member free on said main shaft, a gear on said second clutch member, a second gear fixed on said drive shaft and meshing with said first gear, a double clutch element drivingly connected to, and shiftable in two directions on, said main shaft for selectively engaging either of said two clutch members, a transverse tubular shaft mounted on said frame, a pair of yoke arms on said tubular shaft, means whereby rocking movement of said arms in either direction selectively shifts said clutch element, another arm on said tubular shaft, said yoke arms and said other arm extending in the same direction, a foot pedal shaft on said frame, pedal means to rock said foot pedal shaft, an arm on said foot pedal shaft, a second foot pedal shaft on said frame, an arm on said second foot pedal shaft, said foot pedal shaft arms extending radially in relatively opposite directions from their respective pedal shafts, means connecting one of said foot pedal shaft arms to one of said yoke arms, means connecting the other foot pedal shaft arm to the other arm on the transverse tubular shaft, a brake on said drive shaft adapted to be normally urged to braking position, an inner shaft within said tubular shaft, an arm on said inner shaft, means connecting said inner shaft arm and said brake to release the latter, means connecting said inner shaft arm to one of said foot pedal shafts, a second arm on said inner shaft, means connecting said second inner shaft arm to the other foot pedal shaft, said last two mentioned connecting means including a pin and elongated slot connection, said last two mentioned connecting means being disposed on the same side of said inner shaft and the slots of the pin and slot connection being arranged so that movement of either pedal shaft causes a release of said brake prior to the aforesaid engagement of a clutch member.

IRA J. KUERT.
BURNIE M. CRAIG.

REFERENCES CITED

The following references are of record in the file of this patent:

UNITED STATES PATENTS

| Number | Name | Date |
| --- | --- | --- |
| 1,119,270 | Gardner | Dec. 1, 1914 |
| 1,141,295 | Wright | Nov. 1, 1925 |
| 1,534,297 | Le Grand et al. | Apr. 21, 1925 |
| 2,038,843 | Jones | Apr. 28, 1936 |
| 2,180,469 | Jaeger et al. | Nov. 21, 1939 |
| 2,424,617 | Hoyle | July 29, 1947 |